(No Model.)

W. LAMPERT.
BRETZEL MACHINE.

No. 293,336.      Patented Feb. 12, 1884.

WITNESSES
O. H. Engel
Jos. W. Breen

INVENTOR
William Lampert
By Thos. B. Hall
ATTORNEY

UNITED STATES PATENT OFFICE.

WILLIAM LAMPERT, OF CRESTLINE, ASSIGNOR TO HENRY PEUSTER, OF GALION, OHIO.

BRETZEL-MACHINE.

SPECIFICATION forming part of Letters Patent No. 293,326, dated February 12, 1884.

Application filed June 30, 1883. (No model.)

*To all whom it may concern:*

Be it known that I, WILLIAM LAMPERT, a citizen of the United States, residing at Crestline, county of Crawford, and State of Ohio, have invented certain new and useful Improvements in Bretzel-Machines; and I do hereby declare the following to be a description of the same and of the manner of constructing and using the invention in such full, clear, concise, and exact terms as to enable any person skilled in the art to which it appertains to construct and use the same, reference being had to the accompanying drawings, forming a part of the specification, the principle of the invention being herein explained, and the best mode in which I have contemplated applying that principle so as to distinguish it from other inventions.

The controlling object of the invention is to provide a bretzel-machine which can be made and put on to the market at a comparatively small cost. To this end of economy in construction I have devised a change in the ordinary form of cracker-machine, whereby, at a slight expense, a cracker-machine may be adapted by my invention to make bretzels or like articles. This change consists in conducting the upper section of the traveling endless apron beneath the lower die, so that the dough may be delivered on the latter and rest directly thereon while being subjected to the action of the upper die. Said upper section of the apron, after passing beneath the lower die, is conducted upward to the level of the lower die, so that the latter has the carrying-surface of the apron in the same horizontal plane therewith, both forward and rearward thereof.

Figure 1:
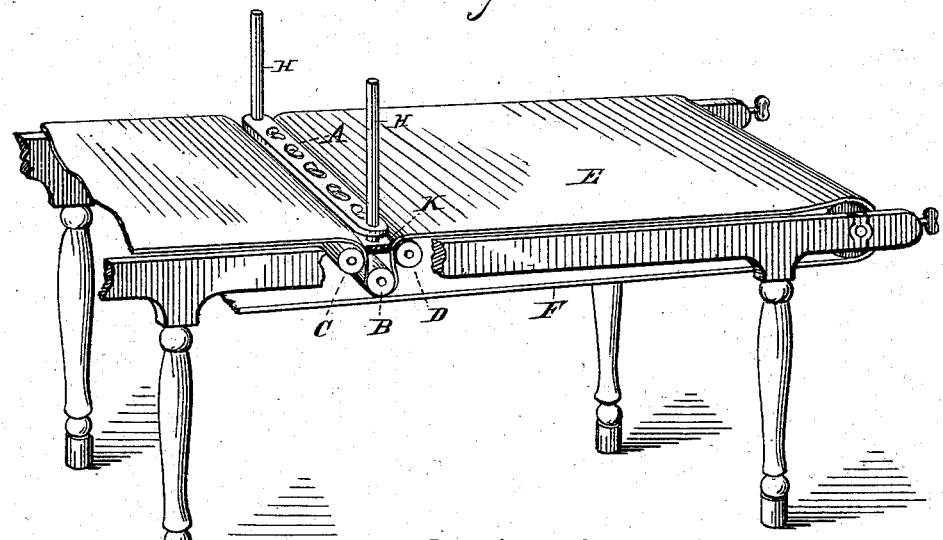
Figure 2:
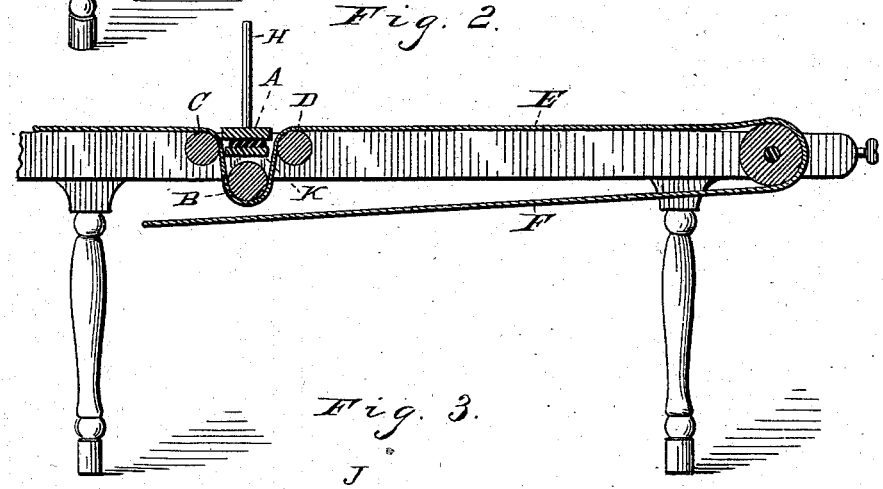
Figure 3:
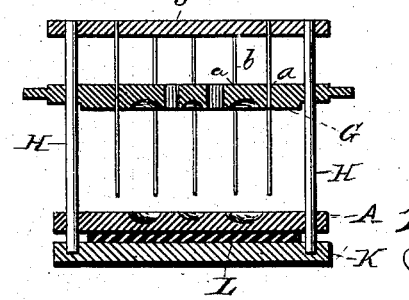

In the drawings, Figure 1 is a perspective view of a portion of a machine adapted to illustrate the invention, the upper die being removed. Fig. 2 is a vertical section of the same. Fig. 3 is a vertical longitudinal section of the two dies and the plate supporting the lower die.

The machine is provided with the lower stationary die, A, in vertical line, below which is the roller B. This roller and die are both located transversely to the apron. To the front and rear of them are respectively located rollers C and D, said rollers being parallel with, but in a horizontal plane above, the roller B. The upper section, E, of the endless apron passes over the forward roller, C, then downward in close proximity to the front edge of the lower die, and thence beneath the low roller, B. It then passes upward in close proximity to the rear edge of the lower die, passes over the rear roller, D, and continues travel toward the rear of the machine. The upper section of the apron, both in front and in rear of the lower die, is practically in the same horizontal plane with the latter, so that the dough has an even path of travel in passing onto and off from the lower die. The lower section, F, of the apron passes in return beneath the parts above mentioned. The upper die, G, has vertical movement on uprights H, and is provided with any suitable number of openings, $a$, in which freely work ejecting-pins $b$. Said pins are secured to an upper support, J, and depend therefrom to eject the bretzel from the upper die as the latter rises. The lower die is supported on a metallic plate, K. To prevent jarring of the upper die as it strikes the lower die, I insert an elastic gasket, L, between said metallic plate and lower die. This cushioning of the lower die also aids the upper die in picking up the dough-scraps, the latter passing up into scrap-holes $c$, formed in any suitable number in the upper die. The designs or conformations of the two dies may be of any desired character, such as to make bretzels, crackers, or other like articles. By simply changing the dies from one size to another bretzels of different sizes may be made. Hence the bretzel manufacturer, by having two or more different sizes of dies on hand, may readily turn out large or small bretzels.

Omissions, substitutions, and changes may be made as regards the forms and parts herein set forth, provided the principles of construction and operation embraced in the following claims are retained and employed.

I therefore particularly point out and distinctly claim as my invention—

1. In a machine for making bretzels or other like articles, the combination, with upper and lower dies, of endless apron having upper section, E, located substantially in the same horizontal plane with the lower die forward and rearward thereof, and means for conducting said apron-section beneath the lower die, substantially as set forth.

2. In a machine for making bretzels or other like articles, the combination, with the lower die and the endless apron, of a guide located below the lower die, beneath which the upper apron-section passes, and two guides respectively located to the front and rear of the lower die, over which said apron-section passes, substantially as set forth.

3. In a machine for making bretzels or other like articles, the combination, with upper and lower dies, and an endless apron whose upper section is located substantially in the same horizontal plane with the lower die forward and rearward thereof, of a guide located in vertical line below the lower die, beneath which said apron-section passes, and two guides respectively located to the front and rear of the lower die, over which said apron-section passes, substantially as set forth.

In testimony that I claim the foregoing to be my invention I hereunto set my hand.

WILLIAM LAMPERT.

Witnesses:
H. DOLL,
F. NEWMAN.